Nov. 3, 1942.
G. A. SMITH
2,300,709
ELECTRICAL PROSPECTING METHOD
Filed Jan. 10, 1941
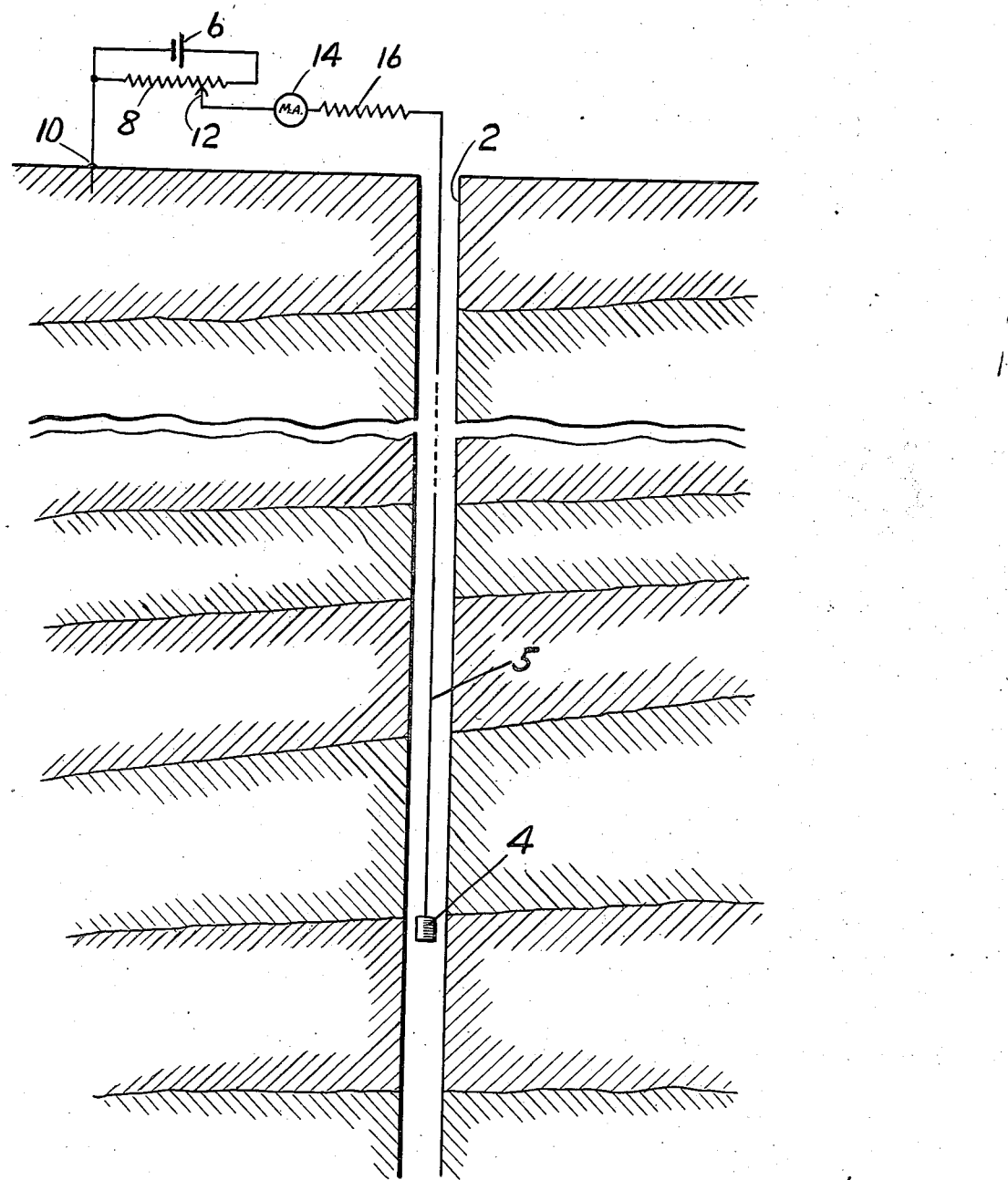
WITNESS:
INVENTOR
George A. Smith
BY
ATTORNEYS.

Patented Nov. 3, 1942

2,300,709

UNITED STATES PATENT OFFICE 2,300,709

ELECTRICAL PROSPECTING METHOD

George A. Smith, Philadelphia, Pa., assignor to Sperry-Sun Well Surveying Company, Philadelphia, Pa., a corporation of Delaware Application January 10, 1941, Serial No. 373,891

2 Claims. (Cl. 175—182)

This invention relates to the exploration of the porosity characteristics of strata traversed by bore holes, and specifically relates to the measurement of the variations in a counter-electromotive force produced by flow of liquid through porous strata induced by the application of a potential.

As pointed out in the patent to Martienssen No. 2,212,274, dated August 20, 1940, it is a well known phenomenon that flow of a liquid through a capillary passage may be caused by the application of a potential across the capillary. The flow of current through the capillary is then accompanied by a liquid flow. Under such conditions, there not only occurs an RI drop due to the resistivity of the liquid in the capillary, but also there appears a counter-electromotive force of such amount that the power required for maintaining the liquid flow is equal to its counter-electromotive force multiplied by the electric current.

The method as carried out in said Martienssen patent fails to take into account the varying resistivities of the strata encountered by the electrode in the measurement of the counter-electromotive force due to the induced osmosis in the strata of the type described above.

It is the object of the present invention to provide an improved method whereby the resistivity variations are eliminated so that a better picture of the variations in the osmotic potential is secured.

The object of the invention will become clearer from consideration of the following description read in conjunction with the accompanying drawing, in which the figure illustrates diagrammatically the arrangement of apparatus for carrying out the method.

In the figure, there is illustrated, at 2, a bore hole penetrating the strata to be explored. As illustrated in the diagram, an electrode 4, making electrical contact with the mud in the bore hole, is supported by means of an insulated cable 5 for movement through the bore hole. At the surface there is provided a constant source of electromotive force 6, for example, a storage battery, across which is connected a potentiometer resistance 8 grounded at one end as indicated at 10. The adjustable slider 12 contacting this resistance is connected to the cable 5 through a meter 14 and a relatively high resistance 16.

The arrangement is such as to provide a substantially constant potential between 12 and the ground, and to this end the potentiometer resistance 8 must be so low that the potential of the point 12 above ground is not substantially varied as varying currents are drawn through the electrode circuit. As a matter of fact, the currents used in accordance with the present invention are relatively small, of the order, for example, of a milliampere or less, and the meter 14 is therefore of a type adapted to indicate currents of that order.

The resistance 16 is used to eliminate resistivity variations from consideration, and functions as will be clear from the following considerations.

Designating by $R_e$ the total external resistances in the circuit, i. e., the total resistances of the resistance 16, the meter 14 and the cable (the latter two of which will be normally negligible relative to the resistance 16), and the resistance appearing at the electrode $R_o$, and designating the counter-electromotive force produced by induced osmosis as $E_o$, and naturally occurring potentials due, for example, to electrochemical action or electrofiltration conditions, as $E_x$, then the current I flowing through the electrode will be given by the equation—

$$I = \frac{E - (E_o + E_x)}{R_e + R_o}$$

The above equation indicates the dependence of the current upon the resistance at the electrode, i. e., it will vary in accordance with that resistance, and if $R_e$ was negligible, as in the case of the method described in said Martienssen patent, the current would be substantially inversely proportional to changes in the resistance at the electrode as the electrode moved through the hole.

Differentiating the above equation:

$$dI = -\frac{d(E_o + E_x)}{R_e + R_o} - \frac{[E - (E_o + E_x)]dR_o}{(R_e \times R_o)^2}$$

If $R_e \gg R_o$, the above becomes to a close approximation:

$$dI = -\frac{d(E_o + E_x)}{R_e}$$

It will thus be seen that if $R_e$ is made sufficiently large, the effects of $R_o$ on the current P may be eliminated as far as desired. In accordance with the present invention, therefore, $R_e$ is made relatively high compared to the highest resistance appearing at the electrode during its passage through the strata. For a given electrode and locality, this maximum resistance which could be expected to be encountered will be known. If, therefore, $R_e$ is made, say, one hundred times such maximum resistance, the changes in current due to the maximum variations of resistance at the electrode may be made less than one per cent. of the variations noted. If a higher accuracy independent of the resistance to variations is desired, it is only necessary to make the external resistance $R_e$ correspondingly larger.

It will be noted that such increase of $R_e$ does not render the current changes any less proportional to the changes of the potentials appearing at the electrode. Of course, as $R_e$ is made greater, a more sensitive meter is required, but meters having full scale sensitivity of 100 microamperes or less are quite rugged and portable, so that increase in $R_e$ is not in the least disadvantageous.

The potential applied to the circuit between points 10 and 12 is not particularly important, except from the standpoint that the constant potential there applied should not be so large as to unduly increase the value of the second term of the differential equation given above, which, as will be evident, will be negligible if $R_e$ is much greater than $R_o$, unless the value of E is abnormally increased. As a guide, it may be said that E should have a value of the same order of magnitude as the electro-osmotic flow potentials due to the porosity of the adjacent strata, although it may be increased substantially above this if desired. The disadvantage of increasing it too greatly is that the meter 14 must be chosen of a capacity dependent upon this potential, and if it is too large, the observed variations will occupy only a small portion of its scale. If the meter is not simply a current measuring meter but includes a suitable bucking circuit, a larger magnitude of the supply potential is not disadvantageous.

As indicated in the final equation given above, the variations observed are not solely due to the variations in the electro-osmotic potential, but also involve, in algebraic summation, variations in other natural potentials which may appear at the electrode. In general, however, these other potentials are of a lower order of magnitude than in the electro-osmotic potentials, and the variations in current observed are, in a relatively minor degree, dependent thereon, but for the practical purpose of electrical logging, this is quite immaterial, since electrical logs are generally used for comparison purposes rather than for the purpose of making absolute measurements, and they are always interpreted by those skilled in the art on the basis of empirical knowledge gained from experience. It is not, therefore, the object of the present invention to segregate completely the changes due to electro-osmotic potentials from changes due to other locally occurring potentials, but primarily to segregate such variations from the effects which might be due to resistivity changes, which are of very substantial magnitude and would serve to mask completely the electro-osmotic potentials.

The meter 14 may be of recording type, arranged, for example, to record its indications photographically on a strip moved in correspondence with the electrode movements. Or, alternatively, recording may be done in the hole. Such recording methods form no part of this invention and may be carried out as indicated, for example, in Pearson and Nichols application, Serial No. 19,434, Nichols and Williston application, Serial No. 73,982, Pearson and Smith application, Serial No. 63,558, now Patent No. 2,271,951 of February 3, 1942, or Bazzoni and Razek Patent No. 2,167,630, dated August 1, 1939, each of which shows means for recording meter readings applicable to a meter such as used herein and correlating the indications with depth. The method of this invention may, of course, be combined with other logging methods including those determining high frequency characteristics of strata, resistivities, acoustic characteristics, etc.

The electrode 4 is desirably of conventional non-polarizing type and may be the cathode or anode of the system.

What I claim and desire to protect by Letters Patent is:

1. The method of determining porosity characteristics of strata traversed by a bore hole comprising moving through the bore hole an electrode, causing a flow of current through strata surrounding the electrode by applying to the electrode, through a resistance of a substantially higher order than any resistances appearing at the electrode during its passage through the strata, a substantially constant potential of the same order of magnitude as the electro-osmotic flow potentials due to the porosity of the adjacent strata, and observing the changes of intensity of the electrode current as a measure of the porosity characteristics while the electrode traverses the strata.

2. The method of determining porosity characteristics of strata traversed by a bore hole comprising moving through the bore hole an electrode, causing a flow of current through strata surrounding the electrode by applying to the electrode, through a resistance of substantially higher order than any resistances appearing at the electrode during its passage through the strata, a substantially constant direct potential, and observing the changes of intensity of the electrode current as a measure of the porosity characteristics while the electrode traverses the strata.

GEORGE A. SMITH.